United States Patent Office 3,438,179
Patented Apr. 15, 1969

3,438,179
METHOD OF SAMPLING AEROSOLS BY SUCTION AND DEVICE FOR THE APPLICATION OF SAID METHOD
Pierre Jouault, Paris, France, assignor to Commissariat à l'Energie Atomique, Paris, France
Filed Nov. 15, 1965, Ser. No. 507,741
Claims priority, application France, Nov. 30, 1964, 996,816
Int. Cl. B01d 25/02
U.S. Cl. 55—97                               5 Claims

ABSTRACT OF THE DISCLOSURE

A collecting filter extends across the mouth of a conduit through which a stream of air is drawn by a suction pump. A porous, sintered bronze member also extends across the mouth of the conduit immediately downstream of the filter and is impregnated by a viscous fluid, such as oil contained in a reservoir and distributed by radially disposed tubes to the center portion of the porous member through a valve which is responsive to a predetermined degree of pressure in the conduit downstream of the porous member. The rate of flow of the stream of air through the collecting filter is maintained substantially constant by controlling the degree of impregnation of the porous member so that the sum of the head losses across both the filter and the impregnated porous member is maintained at a substantially constant predetermined value.

---

The concentrations of long-lived radioactivity in the atmosphere which are considered as permissible are extremely low. In order to monitor this radioactivity, samples of particles in suspension in the atmosphere must accordingly be made available in substantial quantities.

These samples, more commonly referred to as aerosols, are at present taken by drawing air into an apparatus consisting mainly of a volumetric pump which is conected by means of a pipe to a window which carries a filter. By means of said pump, an air stream is passed through the filter for a period of time which is either equal to or greater than 24 hours, the flow density being such that a substantial quantity of aerosols is permitted to collect on the filter. During the initial hours of operation of the apparatus, the head loss across the filter is small and the corresponding air flow rate is high. However, progressively as the filter becomes clogged by the aerosols, the head loss increases whereas the corresponding air flow rate decreases. This progressive diminution of the flow rate during a sampling test is accompanied by a variation in the proportion of particles sampled, with the result that the measured concentration of radioactivity, for example in the case of a given radioactive cloud, varies according to the time at which the sample is taken, that is to say the time at which the cloud passes. The object of this invention is to reduce such variations as far as possible while maintaining the head loss at a substantially constant value.

The invention is accordingly directed to a method of sampling by suction through a collecting filter, characterized in that it consists in causing the gas stream which has passed through the filter to flow through a porous member and in varying the porosity of said member in such a manner as to maintain at a constant value the sum of head losses across the filter and across said porous member.

According to another characteristic feature of the invention, the method consists in causing the gas stream which has passed through the filter to flow through a porous disc and, while said stream is flowing through said disc, in impregnating said disc with a quantity of viscous fluid such that the sum of head losses across the filter and the disc has a predetermined value, then in reducing the quantity of fluid with which said disc is impregnated progressively as the head loss through the filter increases and in maintaining the sum of these head losses at said predetermined value.

The flow of indrawn air therefore remains substantially constant throughout the operation of the device and the measurement is taken on the same proportion of aerosol irrespective of the time at which the sampling test is made.

This invention also extends to a device for the practical application of said method, said device comprising a pump which is connected by means of a pipe to a window carrying a filter, and characterized in that it comprises a disc of porous material which is mounted on the downstream side of the filter, a reservoir for viscous fluid, at least one distributor tube for admitting said fluid at a point near the center of the disc and means for regulating the supply of said fluid which is subjected to the pressure downstream of the filter and also for regulating the total head loss through the device.

Any variation in the flow of air which is drawn into the pipe is immediately transmitted to the fluid control and produces a corresponding variation in the rate of supply of fluid to the disc until the initial air flow rate has been restored. The disc therefore receives a quantity of fluid which is continuously regulated according to the real total head loss of the device and maintains this latter at a substantial constant value.

Further characteristic features and advantages of the invention will be brought out by the following description and by the accompanying drawings in which one form of embodiment of the device in accordance with the invention is given by way of example and not in any limiting sense.

Said form of embodiment relates to an apparatus for sampling aerosols collected on a stationary filter. However, the device in accordance with the invention can be adapted to devices fitted with movable filters.

In the accompanying drawings:

FIG. 1 illustrates an aerosol sampling device as shown in longitudinal cross-section.

FIG. 2 is a partial view on a larger scale and in cross-section taken along the line I—I of FIG. 1.

Figures 1, 2:
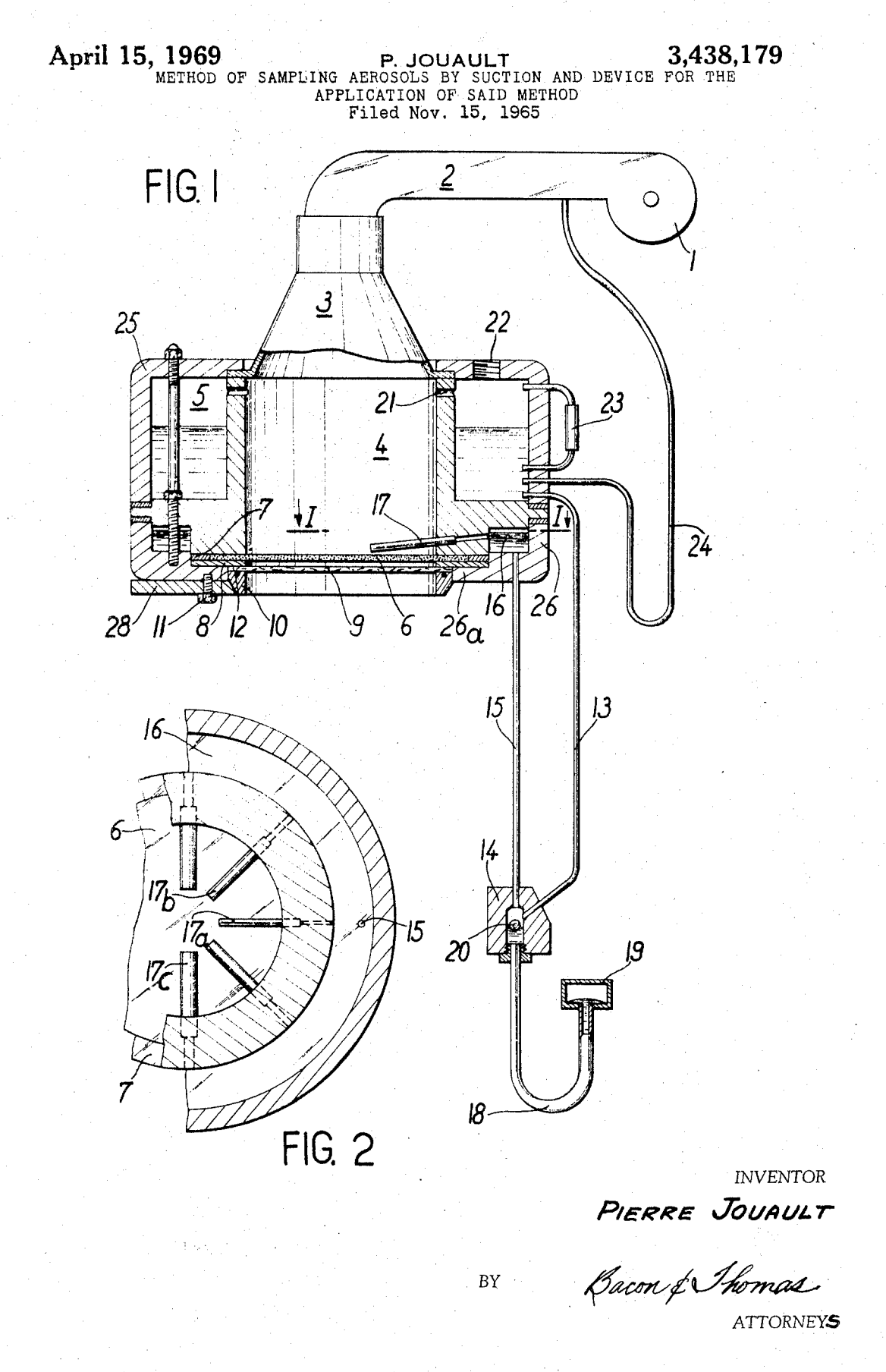

The device shown in FIG. 1 comprises a volumetric pump 1 which is connected to a pipe 2, the conical end 3 of which is made integral with a cylindrical chamber 4 closed by a filter 9 which is held by a filter support 10 with interposition of an O-ring seal 12, thus preventing any leakage of indrawn air around the useful surface of the filter.

Between said filter 9 and the wall of the chamber 4 is mounted a disc 6 of porous material such as sintered bronze which is surrounded by a washer 7 and separated from the filter 9 by another washer 8 so as to prevent any contact between said disc and said filter.

When air is sucked in by the pump 1, the particles in suspension are stopped by the filter 9 and deposited thereon, progressively clogging said filter. The head loss across the filter accordingly increases as a function of the quantity of particles deposited thereon.

In order that the flow of air which is drawn into the chamber 4 and conical duct 3 should be maintained constant in spite of the clogging process, the head loss across the disc is varied as a reciprocal function of the head loss across the filter, with the result that the sum of said head losses remains substantially constant. To this end, the porosity of the disc at the beginning of the suction process is reduced by impregnation with a viscous fluid in a quantity such that the total head loss through the device reaches a predetermined value. Then, progressively as the filter becomes clogged, the quantity of fluid with which the disc is impregnated is reduced and the porosity of the disc increases. The respective head losses across the disc and across the filter accordingly vary in inverse ratio and the sum of said head losses can be maintained constant.

The total head loss can readily be checked, for example, by measuring the pressure within the chamber 4. The variation in porosity of the disc 6 which results from impregnation with the fluid is then subjected to said pressure and is regulated in accordance with a predetermined value of this latter which corresponds to the desired working head loss.

The flow of air which is drawn into said chamber 4 is thus substantially the same irrespective of the quantity of particles already deposited on the filter and the sampling rate is constant during the entire period of operation.

This method is preferably carried into practice by means of a device such as that which is illustrated in FIGS. 1 and 2 and in which the chamber 4 is surrounded on the one hand by a main reservoir 5 containing a viscuous fluid such as oil and communicating with said chamber 4 through ports 21 which have their openings above the oil level and, on the other hand, by an auxiliary reservoir 16 located in the vicinity of the disc 6. The outer wall 26 of said reservoir 16 extends beneath the chamber 4 and forms an annular flange 26a for the purpose of holding the disc 6 and washers 7 and 8. The filter-holder 10 is mounted internally of said annular flange 26a but is secured thereto by means of screws 11 which pass through support plates 28, which are three in number, for example, and which form lateral extensions of said filter-holder.

The annular reservoir 5 is put into communication by means of a tube 13 located at the bottom thereof with a mercury-filled expansion vessel 14 which is connected by a tube 15 to the annular reservoir 16.

The expansion vessel 14 is provided at the base thereof, in the line of extension of the tube 15, with an elbowed tube 18 which terminates in an air-filled flask 19. Provision is made within the vessel 14 for a ball 20 which floats at the surface of the mercury and obturates the tube 15 when the level of mercury rises.

There extend from the reservoir 16 a series of tubes such as the tube 17, the openings of which are located in the vicinity of the center of the disc 6. Said tubes 17, which can be of variable number, are spaced around the reservoir 16 (as shown in FIG. 2). The diameters of said tubes are unequal, so that the tube 17a which is located nearest the tube 15, that is to say nearest the tube which communicates with the reservoir 5, has the smallest diameter and the other tubes 17b, 17c have progressively larger diameters as they are more distant from said communicating tube.

Said reservoir 5 is fitted with a level indicator 23 and a Pitot tube 24 which makes it possible after preliminary calibration to determine the quantity of air which flows through the assembly consisting of filter 9 and disc 6 and to control the operation of the device. An opening 22 which is pierced in the top wall 25 of the reservoir 5 and which is closed off during a sampling test serves for the introduction of oil.

Since the head loss has to be maintained at a predetermined value throughout the sampling operation, the volume of air which is imprisoned in the flask 19 and the change in level of mercury are chosen so that, in respect of said head loss or working head loss, the pressure of the air which is imprisoned in the flask 19 is slightly higher than the pressure which prevails within the cylindrical chamber 4 and the annular reservoir 5 and to which is added the pressure created by the change in level of the mercury. The pressure of the oil contained in the annular reservoir 5 is negligible. When the requisite head loss is reached, the ball-float 20 accordingly obturates the inlet of the pipe 15.

The operation is therefore as follows:

When the pump 1 is started up with an unused filter 9 in position, the head loss across said filter alone is smaller than the working head loss and accordingly the pressure which prevails within the chamber 4 and the annular reservoir 5 is higher than the pressure which corresponds to said working head loss the effect thereby produced being to lower the mercury and ball-float level slightly within the vessel 14 and to open the pipe 15. The oil contained in the reservoir 5 then flows out slowly through the pipe 13 into the top portion of the expansion vessel 14, penetrates into the tube 15 and thence into the lower reservoir 16, then flows onto the disc 6 of sintered bronze through the tubes 17. The oil then impregnates the entire disc by reason of the phenomenon of capillarity, thus increasing the air flow resistance and consequently the head loss across the assembly consisting of filter and sintered bronze disc. However, no drop of fluid is liable to reach the filter.

Progressively as the head loss increases, the pressure decreases, slightly within the chamber 4 and the annular reservoir 5. The level of the mercury and ball-float rises and the ball-float 20 reduces the flow of oil through the pipe 15, then stops at the moment when the pressure within the chamber 4 corresponds to the condition of equilibrium within the expansion vessel 14, that is to say at the moment when the total head loss of the device has reached the working value.

As the suction process continues, particles are progressively deposited on the filter and the head loss across the filter increases whilst the disc is subjected to a relatively rapid drying process by the gas stream, with a resulting tendency toward a reduction in head loss across said disc. However, such a reduction is continuously compensated by the admission of viscuous fluid. In fact, as soon as the head loss across the disc 6 falls below the desired value, the pressure within the chamber 4 rises, the pipe 15 is opened and impregnation fluid is admitted. If, on the contrary, said impregnation becomes too substantial, for example as a result of a sudden increase in the extent of clogging of the filter 9, the head losses within the chamber 4 and the ball-float 20 rises again to close off the pipe 15.

The clogging process usually takes place at a sufficiently slow rate and regulation of the head loss and consequently of the air flow is carried out in a satisfactory manner. Furthermore, this regulation of the head loss takes place irrespective of the cause which may produce a variation in the head loss: progressive clogging of the filter, modification of atmospheric conditions or the like.

Analysis of the filter thus gives the precise average value of the radioactivity actually present in the atmosphere during a sampling test performed at the location considered. In point of fact, the flow of air drawn into the apparatus remains constant and the volumes of gas sampled during each unit of time are equal.

What I claim is:

1. A method for sampling aerosols by drawing by suction a stream of gas at a substantially constant rate through a collecting filter comprising: supporting an aerosol collecting filter in the flow path of a gas stream; mounting a porous member in said gas stream immediately downstream of said filter; drawing by suction the gas stream successively through the filter and the porous member; the head loss across the filter increasing as a function of the quantity of aerosols deposited thereon; flowing onto said porous member near the center thereof a quantity of viscous fluid, impregnating by capillarity said member with said liquid flow thereonto and increasing the head loss thereacross as a function of the degree of impregnation thereof until the sum of the head losses across the filter and the impregnated porous member has a predetermined value indicative of a specific rate of gas flow therethrough, and thereafter automatically regulating as a direct function of the pressure on the downstream side of the filter the quantity of the fluid flowing to and impregnating said porous member to be such that the sum of the head losses across the filter and the impregnated porous member is maintained substantially constant at said predetermined value, the regulation of the quantity of fluid flowing to and impregnating said porous member progressively reducing the quantity of said viscous liquid impregnating said porous member as aerosols progressively collect on said filter.

2. Apparatus for sampling aerosols by suction, comprising: conduit means, an aerosol collecting filter supported transversely of said conduit means; a porous member mounted transversely in said conduit adjacent to and downstream of said filter; suction pump means connected with said conduit means and operable for drawing a stream of gas successively through said filter and said porous member; an auxiliary reservoir disposed at a higher level than said porous member; a closed main reservoir for holding a supply of a viscous fluid disposed at a higher level than said auxiliary reservoir; the upper part of the interior of said main reservoir, above the level of the viscous fluid being connected with the interior of said conduit means between said porous member and said suction pump means; at least one viscous fluid distributor tube connected with said auxiliary reservoir and disposed generally radially of and adjacent to said porous member, said tube terminating in the vicinity of the center of said porous member for impregnating said porous member with viscous fluid supplied thereto by gravity from said auxiliary reservoir, means connecting said main reservoir with said auxiliary reservoir for conducting viscous fluid from said main to said auxiliary reservoir; valve means connected with said conducting means for controlling the flow of viscous fluid therethrough, said valve being responsive to a predetermined pressure in said conduit downstream of said porous member indicative of a preselected, operating total head loss across both said filter and said porous member for controlling the flow of said viscous fluid, whereby the degree of impregnation of said porous member and thereby the head loss thereacross is controlled for maintaining the total head loss across both said filter and said porous member at substantially said preselected, operating head loss.

3. Apparatus for sampling aerosols according to claim 2 wherein a plurality of radially disposed, viscous fluid distributor tubes are connected with said auxiliary reservoir and terminate in the vicinity of the center of said porous member, said tubes being laterally spaced apart and having variable diameters which increase progressively as the tubes are positioned further away from the point at which fluid is admitted into the auxiliary reservoir.

4. Apparatus for sampling aerosols according to claim 2 wherein said valve means comprises a housing having a closed chamber therein, a U-shaped tube connected at one end of the bottom of said chamber; a body of mercury in said housing and filling said tube, an air-filled flask mounted on and closing the other end of said tube; a valve seat on said housing in the top of said chamber; and a ball valve in said chamber floating on the surface of said mercury and cooperating with said valve seat; said means connecting said main reservoir with said auxiliary reservoir comprising a supply pipe connected between said main reservoir and the top portion of said chamber; and a discharge pipe connected with said valve seat and with said auxiliary reservoir, the pressure in said conduit being conveyed to the surface of said mercury through said supply pipe.

5. A device in accordance with claim 2 wherein said porous member is made of sintered bronze.

References Cited

UNITED STATES PATENTS

| | | | |
|---|---|---|---|
| 1,409,364 | 3/1922 | Dobbs et al. | 55—233 X |
| 1,766,124 | 6/1930 | Hendrickson | 55—225 |
| 2,135,285 | 11/1938 | Gibson | 55—233 X |
| 2,146,071 | 2/1939 | Horvath | 55—233 X |
| 2,654,387 | 10/1953 | Innes | 137—251 |
| 2,719,707 | 10/1955 | Rector | 261—78 X |
| 2,726,732 | 12/1955 | Faust et al. | 55—219 |
| 2,785,803 | 3/1957 | Young | 55 |
| 2,819,774 | 1/1958 | Schmidt et al. | 55—270 X |
| 2,887,308 | 5/1959 | Sala | 261—117 X |
| 2,926,747 | 3/1960 | Wright et al. | 55—233 |
| 3,067,991 | 12/1962 | Davy et al. | 261—118 X |
| 3,135,592 | 6/1964 | Fairs et al. | 55—233 X |
| 3,248,859 | 5/1966 | Stephenson et al. | 55—233 |
| 3,261,147 | 7/1966 | Allander | 55—233 |

FOREIGN PATENTS

| | | |
|---|---|---|
| 431,894 | 7/1926 | Germany. |
| 554,027 | 6/1943 | Great Britain. |
| 932,913 | 12/1947 | France. |

HARRY B. THORNTON, *Primary Examiner.*

DENNIS E. TALBERT, JR., *Assistant Examiner.*

U.S. Cl. X.R.

55—233, 270, 383, 417, 418; 73—28; 137—251; 261—1, 94